United States Patent [19]
Li

[11] Patent Number: 6,075,295
[45] Date of Patent: Jun. 13, 2000

[54] SINGLE INDUCTOR MULTIPLE OUTPUT BOOST REGULATOR

[75] Inventor: Thomas Li, Mountain View, Calif.

[73] Assignee: Micro Linear Corporation, San Jose, Calif.

[21] Appl. No.: 08/840,279

[22] Filed: Apr. 14, 1997

[51] Int. Cl.[7] .................................................. H02J 1/00
[52] U.S. Cl. .............................. 307/39; 307/38; 307/41
[58] Field of Search .................................. 307/38, 39, 41; 323/222

[56] References Cited

U.S. PATENT DOCUMENTS

| | | | |
|---|---|---|---|
| 3,294,981 | 12/1966 | Bose ....................................... | 307/88.5 |
| 3,603,809 | 9/1971 | Uchiyama ............................... | 307/228 |

(List continued on next page.)

FOREIGN PATENT DOCUMENTS

| | | | |
|---|---|---|---|
| 60-22490 | 2/1985 | Japan ........................................... | 5/41 |

OTHER PUBLICATIONS

"Nonlinear–Carrier Control for High Power Factor Rectifiers Based On Flyback, Cuk, or Sepic Converters," R. Zane and D. Maksimovic, Applied Power Electrics Conf., pp. 814–820, 1996.

"Nonlinear–Carrier Control for High Power Factor Boost Rectifiers," D. Maksimovic, Y. Jang, R. Erikson, Applied Power Electronics Conf., pp. 635–641, 1995.

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current–Mode Pulse–Frequency Modulation", Urs Mader and K. Kit Sum, Micro Linear Corporation.

"ML4861 Low Voltage Boost Regulator", Micro Linear Corporation, Jun. 1993.

"11. Variable Frequency Converters", K. Kit Sum, pp. 96–97, 134–35, 1993.

"3.3V/5V/Adjustable Output, Set–up, DC–DC Converters", Maxim Integrated Products, pp. 1–8, 1993.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

(List continued on next page.)

*Primary Examiner*—Jeffrey Gaffin
*Assistant Examiner*—Peter Zura
*Attorney, Agent, or Firm*—Haverstock & Owens LLP

[57] ABSTRACT

The present invention provides two or more output voltages from one input voltage and one inductor. Each output voltage is formed by a switch controlling the charge delivered to each of the corresponding output capacitors. Preferably, a diode is placed in series with each switch that controls the charging of the output capacitors to prevent any extraneous stray current from escaping while the switch is closed. The controller utilizes pulse width modulation to deliver the correct amount of energy to each load and to synchronize the order of energy delivery to each load. The use of one input voltage and one inductor for charging multiple output voltages simplifies the complexity of the circuit of the present invention and eliminates the need for a single inductor dedicated to each load. Further, the predetermined output voltage level for each load can be changed without modifying the passive elements in the circuit. Rather, the predetermined voltage level for each load is changed by re-programming the controller thereby modifying the duration and frequency of the pulse received by the respective load from the charging inductor.

41 Claims, 6 Drawing Sheets

Multi-output Boost Regulator

U.S. PATENT DOCUMENTS

| | | | |
|---|---|---|---|
| 3,660,753 | 5/1972 | Judd et al. | 323/22 T |
| 3,742,330 | 6/1973 | Hodges et al. | 321/9 A |
| 3,883,756 | 5/1975 | Dragon | 307/265 |
| 4,035,710 | 7/1977 | Joyce | 363/37 |
| 4,293,904 | 10/1981 | Brooks et al. | 363/86 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,422,138 | 12/1983 | Kornrumpf | 363/21 |
| 4,437,146 | 3/1984 | Carpenter | 363/21 |
| 4,454,558 | 6/1984 | Huddart | 361/153 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,661,896 | 4/1987 | Kobayashi et al. | 363/24 |
| 4,672,303 | 6/1987 | Newton | 323/285 |
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,950,974 | 8/1990 | Pagano | 323/222 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,070,439 | 12/1991 | Remson | 363/22 |
| 5,130,598 | 7/1992 | Verheyen et al. | 310/316 |
| 5,132,606 | 7/1992 | Herbert | 323/266 |
| 5,138,249 | 8/1992 | Capel | 323/283 |
| 5,146,399 | 9/1992 | Gucyski | 363/89 |
| 5,161,097 | 11/1992 | Ikeda | 363/124 |
| 5,272,613 | 12/1993 | Büthker | 363/21 |
| 5,278,490 | 1/1994 | Smedley | 323/222 |
| 5,349,284 | 9/1994 | Whittle | 323/207 |
| 5,359,281 | 10/1994 | Barrow et al. | 323/284 |
| 5,397,976 | 3/1995 | Madden et al. | 323/222 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,436,550 | 7/1995 | Arakawa | 323/222 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,570,276 | 10/1996 | Cuk et al. | 363/16 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,663,874 | 9/1997 | Mader et al. | 363/21 |
| 5,691,592 | 11/1997 | Gunderson et al. | 310/317 |
| 5,691,889 | 11/1997 | Bazinet et al. | 363/89 |
| 5,747,977 | 5/1998 | Hwang | 323/284 |

OTHER PUBLICATIONS

"Small–Signal High–Frequency Analysis Of The Free–Running Current–Mode–Controlled Converter", Richard Redl, pp. 897–906, IEEE, 1991.

"Low–Voltage–Input, 3V/3.3V/5V/Adjustable–Output, Step–Up DC–DC Converters", Maxim Integrated Products, pp. 4–189 to 4–191 (no date).

"LT1073 Micropower DC–DC Converter Adjustable and Fixed 5V, 12V", Linear Technology, pp. 4–174 to 4–189, 4–192, (no date).

"Step-up/Step Down Converters Power Small Portable Small Portable Systems", Bruce D. Moore, EDN, pp. 81–82, Feb. 3, 1994.

"ML4823 High Frequency Power Supply Contoller," Micro Linear Corporation, Dec. 1994.

"ML4863 High Efficiency Battery Pack Converter (Preliminary)", Micro Linear Corporation, Jun. 1994.

"ML4880 Portable PC/PCMCIA Power Controller (Preliminary)", Micro Linear Corporation, Oct. 1995.

"ML4821EVAL Average Current PFC Controller Evaluation Kit," Micro Linear Corporation, pp. 6–127, Jul. 1992.

"Application Note 30," Linear Technology, P. AN30–42, (No Date).

"System–Engineered Portable Power Supplies Marry Improved Efficiency And Lower Cost", Bruce D. Moore, Maxim Integrated Products (no date).

"CD 54/74 HC 4046A Technical Data," RCA, (no date).

SINGLE INDUCTOR MULTIPLE OUTPUT BOOST REGULATOR

FIELD OF THE INVENTION

This invention relates to the field of multiple output boost regulators. More particularly, this invention relates to multiple output boost regulators having a single inductor.

BACKGROUND OF THE INVENTION

In a typical output boost regulator, the output voltage is controlled by an electronic circuit that measures a level of the output voltage, compares that measured level to a predetermined desired level, and develops a response to that comparison elsewhere in the circuit in order to more accurately achieve the desired output voltage.

Figure 1:
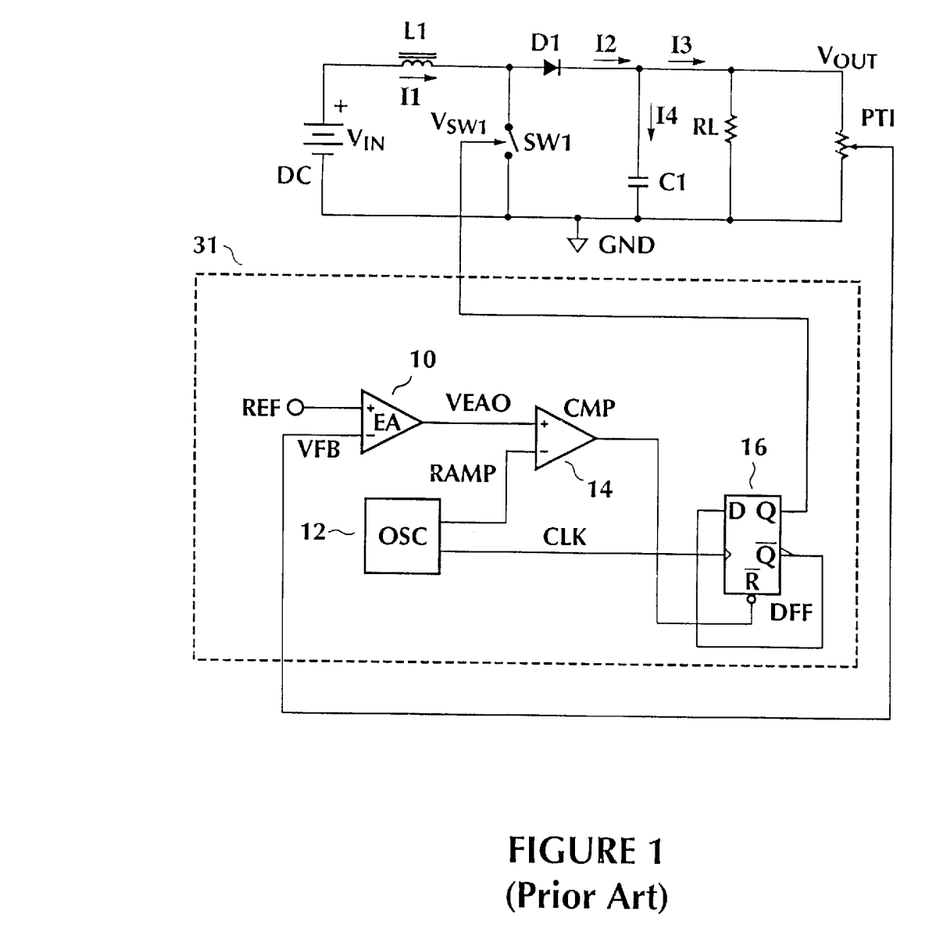
FIG. 1 illustrates a schematic diagram of a single output switching mode boost regulator of the prior art.

Even though the prior art in FIG. 1 teaches an output boost regulator for a single load RL, the prior art does not address the needs of a multiple load output boost regulator wherein the voltage level (Vout) for each load can be different. FIG. 1 illustrates a prior art switching mode output boost regulator that uses a trailing edge modulation control scheme. The input voltage VIN is coupled to a first terminal of an inductor L1. A second terminal of the inductor L1 is coupled to a first terminal of a switch SW1 and to an anode of a diode D1. A capacitor C1 is coupled between a cathode of the diode D1 and a second terminal of the switch SW1. A load RL is coupled across the capacitor C1. A potentiometer PT1 is coupled across the load RL and provides a negative input to an error amplifier 10. A reference voltage REF is coupled to a positive input to the error amplifier 10. An output VEAO of the error amplifier 10 is coupled to a positive input to a pulse width modulating comparator 14. A negative input to the comparator 14 is coupled to receive a ramp output of an oscillator 12. An output of the comparator 14 is coupled as an inverted reset input $\overline{R}$ of a flip-flop 16. An input D of the flip-flop 16 is coupled to an inverted output $\overline{Q}$ of the flip-flop 16. A clock input CLK of the flip-flop 16 is coupled to a clock output of the oscillator 12. An output Q of the flip-flop 16 is coupled to control the state of the switch SW1.

The output voltage VOUT supplied to the load RL is formed by integrating the inductor current I1 in the capacitor C1. Pulse width modulation (PWM) is used to modulate the width of voltage pulses that control the switch SW1, maintaining the output voltage VOUT at a constant level. Energy from the input source VIN is stored in the inductor L1 when the switch SW1 is closed. When the switch SW1 is open, energy from the inductor L1 is transferred to the capacitor C1 and to the load RL. A predetermined fraction of the output voltage VOUT is formed by the potentiometer PT1. This voltage VFB is input into the negative terminal of the error amplifier 10 for comparison to the reference voltage REF. The comparison determines how close the actual output voltage VOUT is to the desired output voltage and is used to modulate the width of the pulses that control the switch SW1.

FIG. 1 illustrates a trailing edge pulse width modulation scheme for controlling the switch SW1. In trailing edge modulation, the switch SW1 turns on (closes) on the trailing edge of the clock signal. The leading edge of the clock signal may also be utilized to implement leading edge modulation. For a leading edge modulation control scheme, the inputs to the error amplifier 10 are reversed: the voltage VFB from the potentiometer PT1 is coupled to the positive terminal of the voltage error amplifier 10 and the reference voltage REF is coupled to the negative terminal of the voltage error amplifier 10. Further, for a leading edge modulation control scheme, the control voltage VSW1 is also reversed. The control voltage VSW1 is taken directly from the output $\overline{Q}$ of the flip-flop 16 instead of from the output Q.

Figure 2:
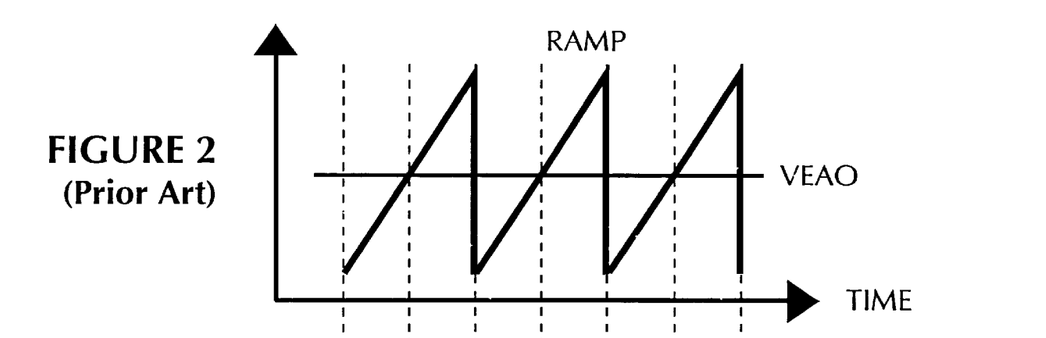
FIG. 2 illustrates a timing diagram of the voltage levels of the error amplifier output VEAO and the modulating ramp output of the oscillator of the switching mode boost regulator of FIG. 1.
Figure 3:
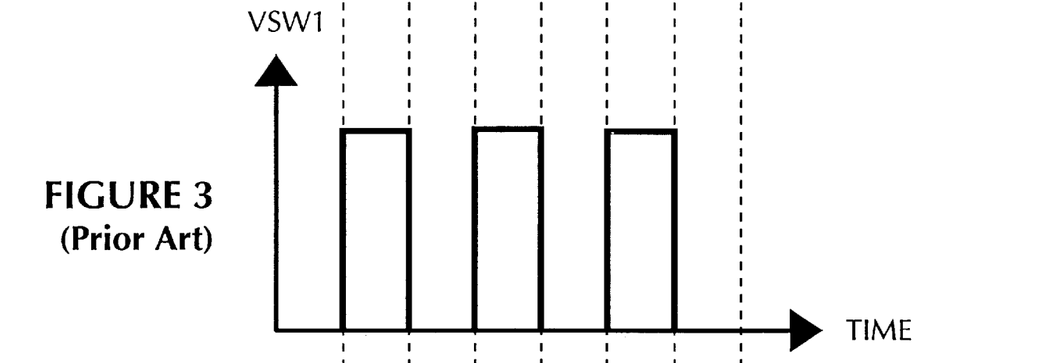
FIG. 3 illustrates a timing diagram of the control voltage VSW1 of the switching mode boost regulator of FIG. 1.
Figure 4:
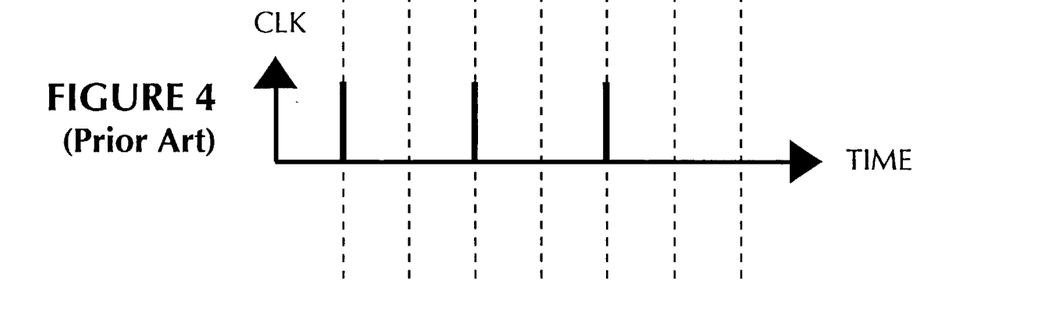
FIG. 4 illustrates a timing diagram of the clock output of the oscillator 12 of the switching mode boost regulator of FIG. 1.

FIGS. 2, 3 and 4 show voltage waveforms with respect to time of various voltage levels within the switch control circuitry 31 illustrated in FIG. 1. The time axis in each of FIGS. 2, 3 and 4 has been drawn to correspond to the others. FIG. 2 illustrates the voltage levels with respect to time of the error amplifier output VEAO and the modulating ramp output of the oscillator 12. FIG. 3 illustrates the voltage level with respect to time of the control voltage VSW1 for the switch SW1. The switch SW1 is "on" or closed when the control voltage VSW1 is at a high voltage level. The switch SW1 is "off" or open when the control voltage is at a low voltage level. FIG. 4 illustrates the clock impulses with respect to time of the clock output of the oscillator 12.

The switch SW1 turns on after the trailing edge of the system clock. Once the switch SW1 is on, the inductor current IL will ramp up and the modulating comparator 14 then compares the error amplifier output voltage VEAO and the modulating ramp RAMP. When the signal RAMP is higher than the signal VEAO, the output of the comparator 14 will fall to a logical low voltage level. Due to the inverter at its input, the input R of the flip-flop 16 will then rise to a logical high voltage level thereby resetting the output Q of the flip-flop 16 to a logical low voltage level and turning off the switch SW1. The duty cycle is determined as a ratio of the on time of the switch to its off time.

Figure 5:
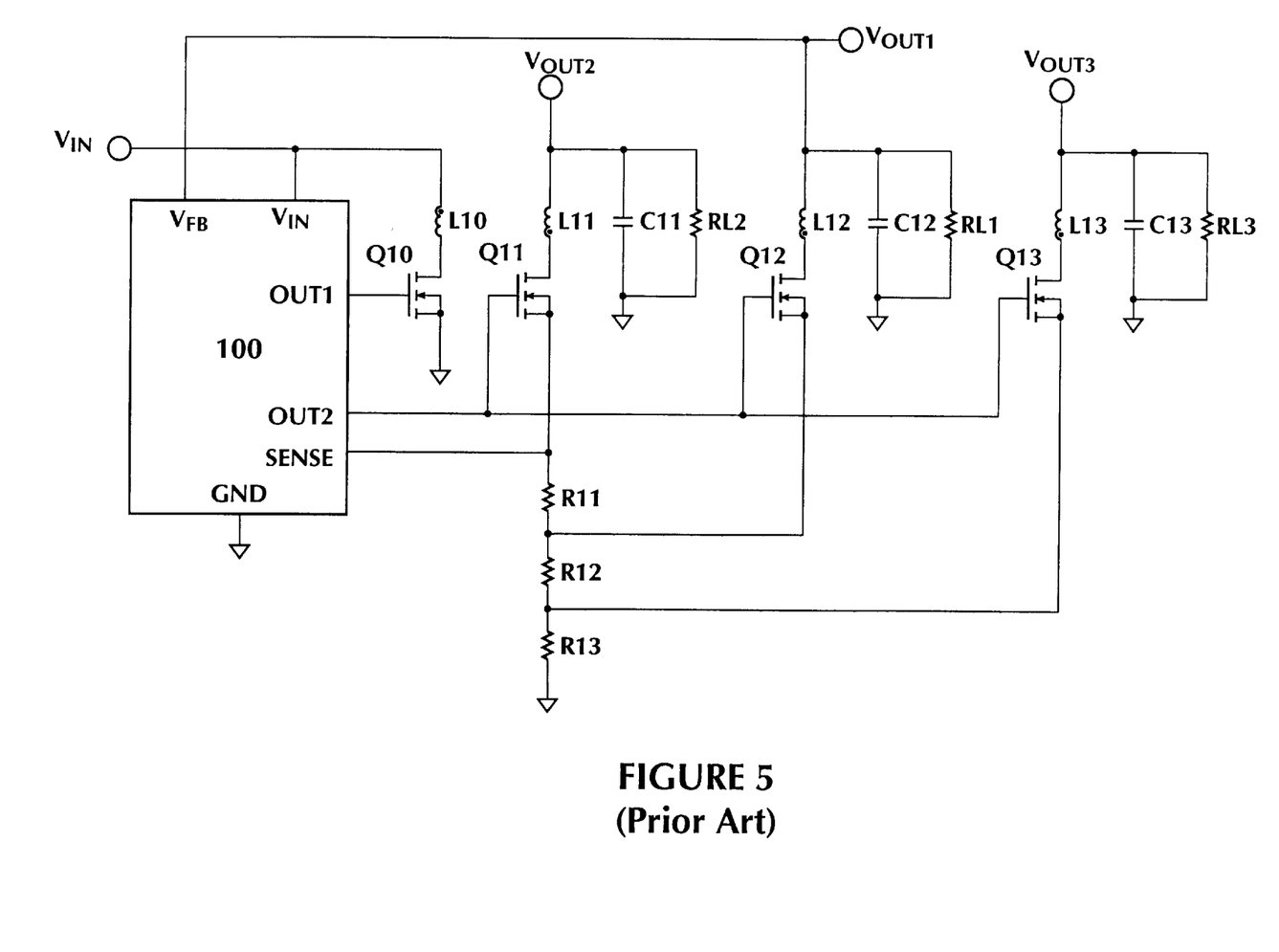
FIG. 5 illustrates a schematic diagram of a multiple output flyback regulator of the prior art using primary and secondary transformers.

Prior art FIG. 5 illustrates a multiple output flyback regulator that allows a different output voltage at each load. However, it will be shown that changing the desired output voltage at any of the loads requires modifying the number of windings in the corresponding inductor associated with that particular load. Further, once such a circuit is constructed, modifying the number of windings would be impractical. A voltage source VIN is coupled to a first terminal of a primary transformer winding L10 and coupled to supply power to an integrated circuit chip controller 100. The first terminal of the transformer winding L10 is designated with a "dot" to show polarity of the primary transformer winding L10 with reference to secondary transformer windings to be discussed below. According to the "dot convention," current entering the primary transformer winding terminal designated with a dot will continue to flow into the dot in the secondary windings when Q10 is open.

A second terminal of the primary transformer winding L10 is coupled to a drain of an NMOSFET Q10. A source of the transistor Q10 is coupled to a ground node. A gate of the transistor Q10 is coupled to be controlled by the controller 100 by a signal designated OUT1. A gate of an NMOSFET Q11, a gate of an NMOSFET Q12 and a gate of an NMOSFET Q13 are all coupled to be controlled by the controller 100 by a signal designated OUT2. A drain of the transistor Q11 is coupled to a first terminal of a secondary transformer winding L11. The secondary transformer winding L11 is inductively coupled to the primary transformer winding L10. The first terminal of the secondary transformer winding L11 is designated with a dot with reference to the primary transformer winding L10. A second terminal of the secondary transformer winding L11 is coupled to a first terminal of a capacitor C11, a first terminal of a load resistor RL2, and an output voltage node VOUT2. A second terminal of the capacitor C11 and a second terminal of the load resistor RL2 are coupled to the ground node.

A drain of the transistor Q12 is coupled to a first terminal of a secondary transformer winding L12. The secondary transformer winding L12 is inductively coupled to the primary transformer winding L10. The first terminal of the secondary transformer winding L12 is designated with a dot with reference to the primary transformer winding L10. A second terminal of the transformer winding L12 is coupled to a first terminal of a capacitor C12, a first terminal of a load resistor RL1, an output voltage node VOUT1, and the controller 100 for providing a feedback voltage signal VFB to the controller 100 (VOUT1 is equivalent to VFB). A second terminal of the capacitor C12 and a second terminal of the load resistor RL1 are coupled to the ground node.

A drain of the transistor Q13 is coupled to a first terminal of a secondary transformer winding L13. The secondary transformer winding L13 is inductively coupled to the primary transformer winding L10. The first terminal of the secondary transformer winding L13 is designated with a dot with reference to the primary transformer winding L10. A second terminal of the secondary transformer winding L13 is coupled to a first terminal of a capacitor C13, a first terminal of a load resistor RL3, and an output voltage node VOUT3. A second terminal of the capacitor C13 and a second terminal of the load resistor RL3 are coupled to the ground node.

A source of the transistor Q11 is coupled to a first terminal of a resistor R11 and to the controller 100 for providing a current sensing voltage signal SENSE to the controller 100. A source of the transistor Q12 is coupled to a second terminal of the resistor R11 and to a first terminal of a resistor R12. A source of the transistor Q13 is coupled to a second terminal of the resistor R12 and to a first terminal of a resistor R13. A second terminal of the resistor R13 is coupled to the ground node.

In the prior art in FIG. 5, the output voltages (VOUT1, VOUT2, and VOUT3) are dependent on the ratio between the primary and secondary transformer ratio windings. If a particular output voltage for a load needed to be modified, the number of windings in the second transformer attached to that load would need to be changed in order to achieve the desired output voltage. Physically changing the secondary transformer in the circuit would be impractical.

What is needed is a multiple output boost regulator having the ability to provide two or more output voltages from one input voltage and one inductor and that can easily change the predetermined output voltage for each load.

SUMMARY OF THE INVENTION

The present invention provides two or more output voltages from one input voltage and one inductor. Each output voltage is formed by a switch controlling the charge delivered to each of the corresponding output capacitors. Preferably, a diode is placed in series with each switch that controls the charging of the output capacitors to prevent any extraneous stray current from escaping while the switch is closed. Preferably, the controller can utilize pulse width modulation or pulse frequency modulation to deliver the correct amount of energy to each load and to synchronize the order of energy delivery to each load.

The use of one input voltage and one inductor for charging multiple output voltages simplifies the complexity of the circuit of the present invention and eliminates the need for a single inductor dedicated to each load. Further, the predetermined output voltage level for each load can be changed without modifying the passive elements in the circuit. Rather, the predetermined voltage level for each load is changed by re-programming the controller thereby modifying the duration and frequency of the pulse received by the respective load from the charging inductor.

DETAILED DESCRIPTION OF THE PREFERRED EMBODIMENT

Figure 6:
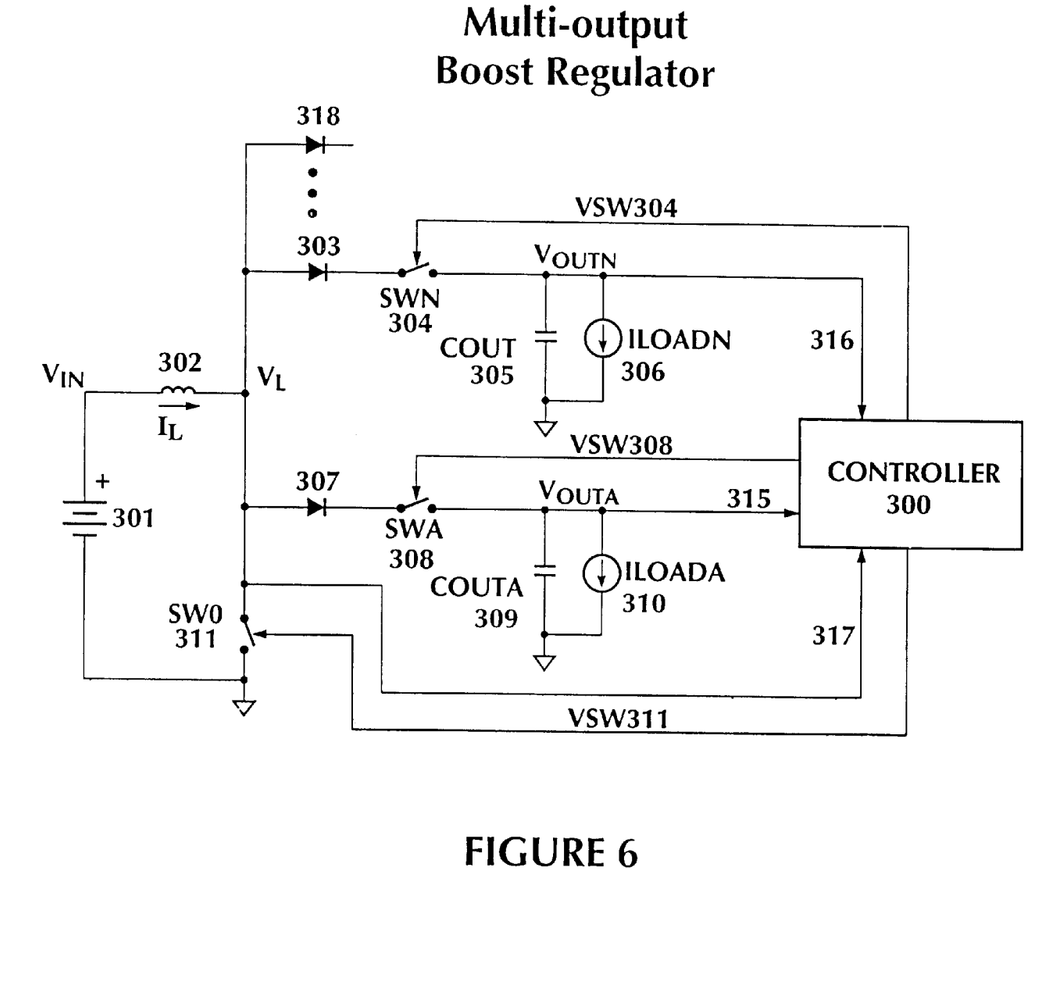
FIG. 6 illustrates a schematic diagram of the preferred embodiment for the multi-output boost regulator to regulate the output voltages.

A schematic diagram of the preferred embodiment of the multiple output boost regulator is illustrated in FIG. 6. A positive terminal of a main power source 301 is coupled to a first terminal of a inductor 302. A second terminal of the inductor 302 is coupled to a first terminal of a switch 311 and to an anode terminal of diodes 303 and 307. The diodes 303 and 307 prevent unnecessary loss of the output voltage at VOUTA and VOUTN by preventing stray current from flowing between the output voltages VOUTA and VOUTN directly to the ground. A second terminal of the switch 311 is coupled to the ground and to a negative terminal of the main power source 301.

A cathode terminal of the diode 303 is coupled to a first terminal of a switch 304. A capacitor 305 is coupled between the ground and a second terminal of the switch 304. A load 306 is coupled across a capacitor 305. A cathode terminal of a diode 307 is coupled to a first terminal of a switch 308. A capacitor 309 is coupled between the ground and a second terminal of the switch 308. A load 310 is coupled across the capacitor 309.

Further, it will be apparent to one of ordinary skill in the art that the device of the present invention could have additional loads and switches coupled to a node VL as illustrated by the three dots and a diode 318 which indicate any number of intervening circuits. The schematic in FIG. 6 shows only two loads, A and N, in the preferred embodiment of the invention and in no way limits the number of loads the device in the present invention can accommodate. It will be apparent to those skilled in the art that the device in the present invention can provide output voltages to multiple loads and modification by adding additional loads may be made to the embodiment chosen for illustration without departing from the spirit and scope of the invention.

A controller 300 has an output control line vsw311 which corresponds to the switch 311. The output control line vsw311 can open or close the switch 311. Further, control lines vsw308 and vsw304 can open or close the switches 308 and 304, respectively. The controller 300 has input lines 315, 316, and 317, that monitor the corresponding voltages at VOUTA, VOUTN, and VL.

The output voltages (VOUTN and VOUTA), supplied to the loads 306 and 310, respectively, are formed by integrating a proportional amount of inductor current IL in the capacitors 305 and 309, respectively. Energy from the main power source 301 is stored in the inductor 302 during the inductor charging phase. Supplying a charge to the output capacitors 305 and 309 at the loads occurs in the discharge phase.

The configuration of the switches 311, 308, and 304 in the present invention determines whether the circuit is charging or discharging. During the inductor charging phase, all the switches are in the open state except for the switch 311. While the switch 311 is in the closed state and all the other switches are in the open state, the main power source 301 charges the inductor 302. Once the inductor 302 is sufficiently charged, the switch 311 is opened. Then, the controller 300 calculates the total available discharge based on the amount of charge stored in the inductor 302, and allocates an appropriate discharge time for each load based on the predetermined output voltage target for each load and the current output voltage level at each load. During the discharge cycle, only one switch is in a closed state at any given time so that the load coupled to the closed switch will receive the maximum charge from the inductor 302.

The controller 300 is responsible for coordinating and implementing the open and closed states for the switches 304, 308, and 311. By comparing the voltage levels from the input lines 315 and 316 at each load with the predetermined target voltage for the respective load, the controller 300 optimizes the duration each switch, which is coupled to a particular load, remains closed. Prior to and during charging cycle, the controller 300 can regulate the level of voltage on the inductor 302 by controlling the duration of the charging cycle on the switch 311 and monitoring the input line 317. Further, the level of voltage on the inductor 302 can be adjusted according to the level of voltage at each of the loads VOUTN and VOUTA which can be monitored through input lines 316 and 315, respectively. In addition, during a discharging cycle, the controller 300 can regulated the amount of current that reaches the loads at VOUTN and VOUTA by controlling the switches 304 and 308, respectively. The controller 300 can also monitor the voltage level at the inductor 302 and the loads at VOUTN and VOUTA, by utilizing the input lines 317, 316, and 315, respectively.

Preferably, the controller 300 utilizes pulse width modulation (PWM) or pulse frequency modulation (PFM) to maintain a constant, correct output voltage level for each load even if the input voltage VIN and the demands of the loads 306 and 310 varies over time. By modulating the width of voltage pulses that control the switches, the output voltage level at each load can be maintained at a constant, correct level. The width of the current pulses that reach each load varies according to the difference between the target voltage level and the actual voltage level at the load. Additionally, by modulating the frequency of the voltage pulses that control the switches, the output voltage level at each of the loads can also be maintained at a constant, correct level. Instead of varying the width of the current pulses that each load receives as with pulse width modulation, pulse frequency modulation varies the frequency of the current pulses that reach each load which varies according to the difference between the target voltage level and the actual voltage level at each load.

Further, there are two schemes that the controller 300 can employ to deliver energy to the loads 306 and 310. The controller 300 can provide energy to the loads 306 and 310 by sending the modulated packets of energy to the loads 306 and 310 on alternating duty cycles. For example, the controller 300 sends the current pulse to the load 306 during the first inductor discharge cycle. During the next inductor discharge cycle, the controller 300 directs the current pulse to load 310. Thus, the controller 300 directs the current pulses to the loads 306 and 310 on alternating inductor discharge cycles.

In another embodiment, the controller 300 directs the modulated packet of energy to the loads 306 and 310 at every inductor discharge cycle. In this embodiment, when the demand for energy from the combination of the loads 306 and 310 is greater than the stored energy of the inductor 302, the energy is proportionally divided among both loads based on the detected output voltage levels via the control lines vsw304 and vsw308. Additionally, by providing a charge to both loads 306 and 310 during every inductor discharge cycle, a higher degree of accuracy and stability of the output voltage level can be achieved.

In both of the above schemes, it might be a concern that the current from a load could escape when a switch coupled to this load is mistakenly closed to charge the load when the voltage at the node VL is lower than the voltage at the load. However, in both of the schemes, the current from a load cannot escape, because a diode is coupled in series between the inductor 302 and each switch that is coupled to a load.

Figure 7:
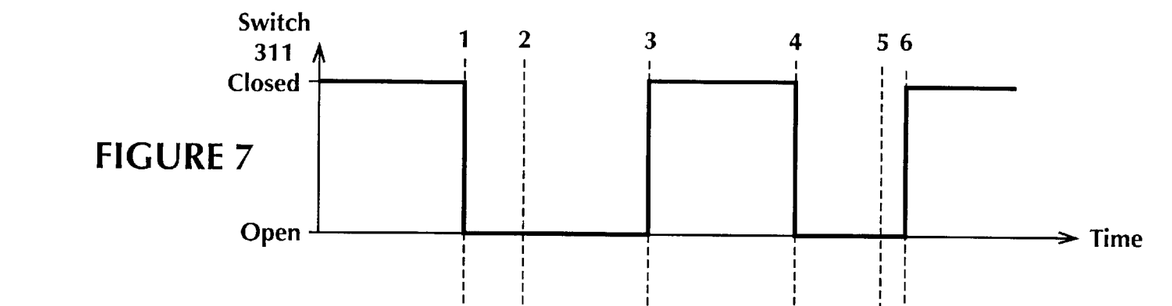
FIG. 7 illustrates a timing diagram showing the open and closed states of switch 311 which controls the multi-output boost regulator of FIG. 6 using a charging scheme that delivers a pulse to two separate loads on every discharge cycle.
Figure 8:
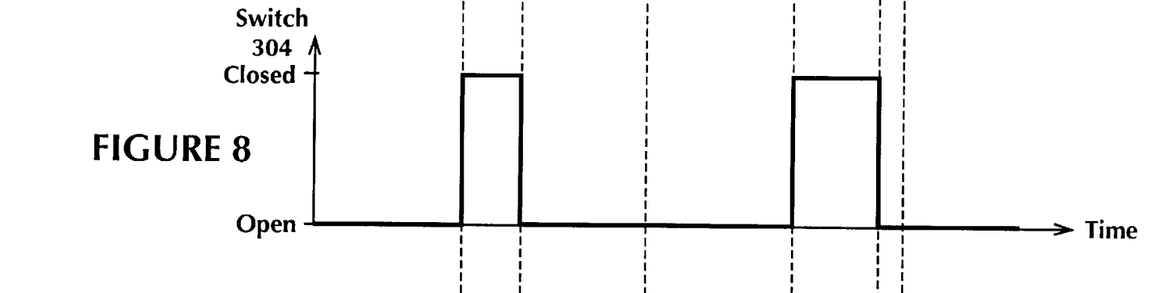
FIG. 8 illustrates a timing diagram showing the open and closed states of switch 304 which controls the multi-output boost regulator of FIG. 6 using a charging scheme that delivers a pulse to two separate loads on every discharge cycle.
Figure 9:
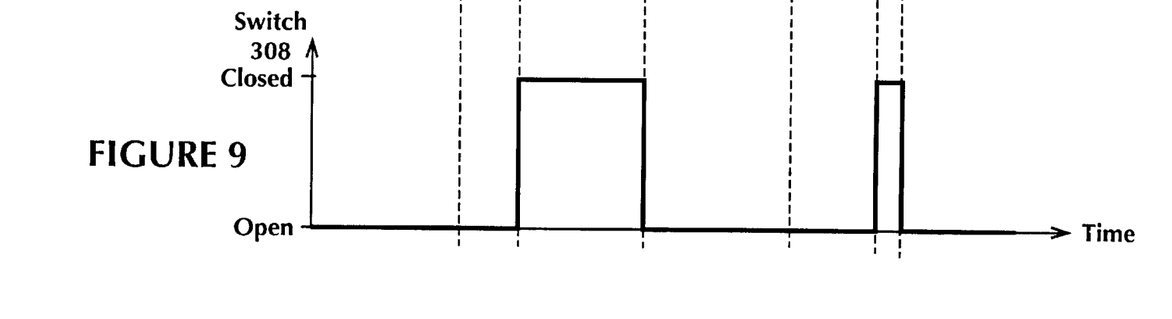
FIG. 9 illustrates a timing diagram showing the open and closed states of switch 308 which controls the multi-output boost regulator of FIG. 6 using a charging scheme that delivers a pulse to two separate loads on every discharge cycle.

FIGS. 7, 8, and 9 illustrate the open and closed states of the switches 311, 304, and 308 when the controller 300 directs a charge to the loads 306 and 310 on every inductor discharge cycle. Further, FIGS. 7, 8, and 9 share the same timing periods which are depicted as time periods 1 through 6. In FIG. 7, while the switch 311 is closed, the inductor 302 is in a charging phase. Likewise, while the switch 311 is open, the inductor 302 is in a discharging phase. In FIG. 7, a fill cycle is illustrated between the time period 3 to the time period 6 where the inductor 302 has gone through one full charging and discharging cycle. The time for the inductor 302 to discharge can vary as illustrated in FIG. 7 when comparing the time periods 1–3 with the time periods 4–6. At the time period 1, the switch 311 changes to an open state and switch 304 changes to a closed state. For the time periods 1 to 2, the switch 304 remains closed and the load 306 is charged as illustrated in FIGS. 7 and 8. For the time periods 2 to 3, the switch 308 is in a closed state, and the switch 304 is in an open state which results in the load 310 being charged as illustrated in FIGS. 7 and 9. In FIGS. 7, 8, and 9, during the time periods 1 to 3, only one load is being charged at a time, and the loads 306 and 310 can receive different amounts of charging time based on the detected output voltage levels at each load through the control lines vsw304 and vsw308 and the predetermined target voltage level at each load.

Figure 10:
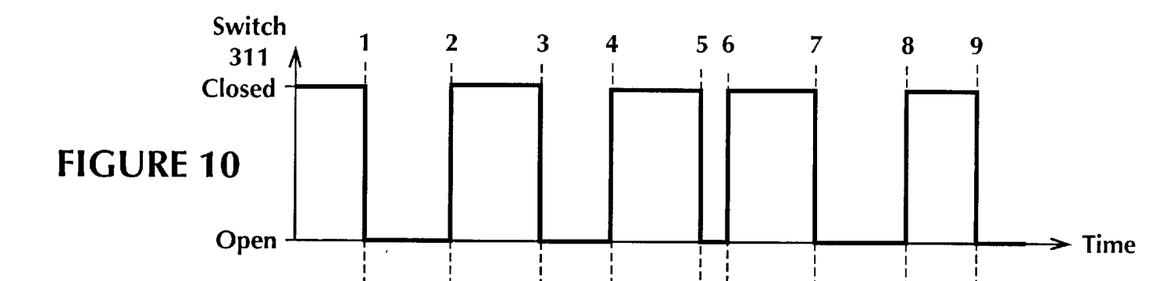
FIG. 10 illustrates a timing diagram showing the open and closed states of switch 311 which controls the multi-output boost regulator of FIG. 6 using a charging scheme that delivers a pulse to each of two loads on alternating discharge cycles.
Figure 11:
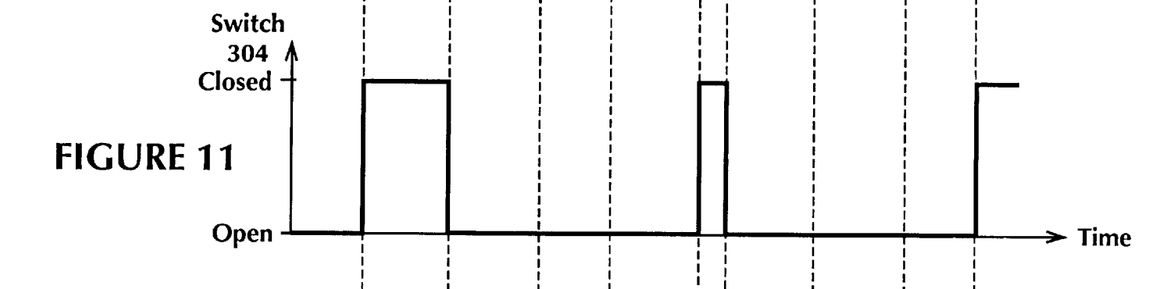
FIG. 11 illustrates a timing diagram showing the open and closed states of switch 304 which controls the multi-output boost regulator of FIG. 6 using a charging scheme that delivers a pulse to each of two loads on alternating discharge cycles.
Figure 12:
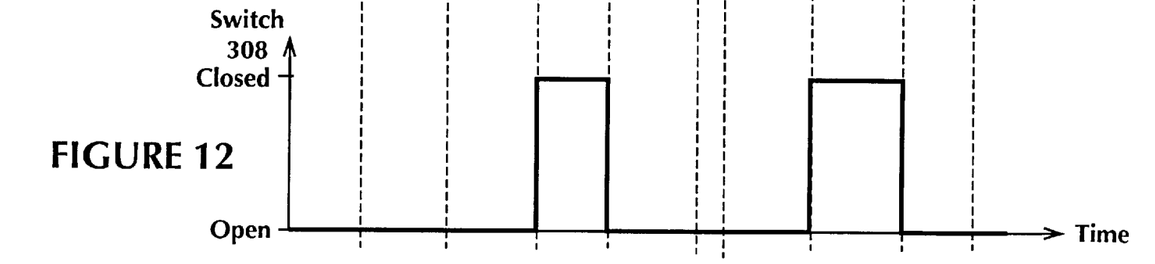
FIG. 12 illustrates a timing diagram showing the open and closed states of switch 308 which controls the multi-output boost regulator of FIG. 6 using a charging scheme that delivers a pulse to each of two loads on alternating discharge cycles.

FIGS. 10, 11, and 12, illustrate the open and closed states of the switches 304, 308, and 311, when the controller provides a charge to the loads 306 and 310 on alternating inductor discharge cycles. Further, FIGS. 10, 11, and 12 share the same timing periods which are depicted as the time periods 1 through 9. FIG. 10 shows the state of the switch 311 which operates in the same manner as described above in FIG. 7. During the first inductor discharge cycle during the time periods 1 to 2, as illustrated in FIG. 10, the switch 304 changes to the closed state which charges the load 306 as illustrated in FIG. 11. During the second inductor discharge cycle during the periods 3 to 4, as illustrated in FIG. 10, the switch 308 changes to the closed state which charges the load 310 as illustrated in FIG. 12.

Thus, a multiple output boost regulator having a single inductor and a controller circuit is described.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modification may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is no way a limitation. For example, it would be within the scope of the invention to add additional loads with corresponding diodes, switches, and control lines disclosed herein. Further, under certain circumstances, it may be possible to sequentially pass the charge stored in the inductor to two or more loads. Such a circuit would most readily be achieved when the invention preferably only passes such a charge to one load at a time.

I claim:

1. A circuit for providing multiple output boost regulation for a plurality of loads comprising:
    a. a charging means comprising a power source and a passive element to store a charge from the power source;
    b. a switching circuit comprising a plurality of switches for connection to each of the plurality of loads and the charging means; and
    c. a controller for coordinating the switching circuit to regulate and sequentially direct the charge from the passive element to each of the plurality of loads so that a regulated DC output voltage level is obtained at each of the plurality of loads.

2. The circuit according to claim 1, wherein the passive element in the charging means is an inductor.

3. The circuit according to claim 1, further comprising a storage means configured in parallel with each of the plurality of loads wherein the storage means is a capacitor.

4. The circuit according to claim 1, wherein the controller includes a means for sensing the output voltage level at each of the plurality of loads.

5. The circuit according to claim 1 further comprising a plurality of diodes wherein each of the plurality of diodes is coupled between the charging means and a corresponding one of the plurality of loads.

6. The circuit according to claim 1 wherein the pulse width modulation circuit is configured to charge each of the plurality of loads within a same charge cycle of the charging means in response to the predetermined output voltage level.

7. The circuit according to claim 1, wherein the controller further comprises a pulse width modulation circuit.

8. A circuit for providing multiple output boost regulation for a plurality of loads comprising:
    a. a charging means comprising a power source and a passive element;
    b. a plurality of load switches wherein each one of the plurality of load switches is coupled between one of the plurality of loads and the charging means;
    c. a charging switch coupled to control the charging means; and
    d. a programmable controller for coordinating the plurality of switches and the charging switch to sequentially direct a current to each of the plurality of loads wherein each of the plurality of loads receives a corresponding regulated DC voltage.

9. The circuit according to claim 8 further comprising a plurality of diodes wherein a one of the plurality of diodes is coupled in series with each of the plurality of load switches to prevent any extraneous current from escaping from one of the plurality of loads while a corresponding one of the plurality of load switches is closed.

10. The circuit according to claim 8 wherein during a first charging cycle the charging means charges the passive element with a first amount of energy and wherein during a first discharging cycle the controller directs a portion of the first amount of energy to a first one of the plurality of loads and does not direct energy to any other load, and wherein during a second charging cycle the charging means charges the passive element with a second amount of energy and wherein during a second discharging cycle the controller directs a portion of the second amount of energy to a second one of the plurality of loads and does not direct energy to any other load.

11. The circuit according to claim 10 wherein the first amount of energy is based upon a level of voltage across the first one of the plurality of loads prior to the first charging cycle and wherein the second amount of energy is based upon a level of voltage across the second one of the plurality loads prior to the second charging cycle.

12. The circuit according to claim 10 wherein the portion of the first amount of energy is based upon a level of voltage across the first one of the plurality of loads during the first discharge cycle and wherein portion of the second amount of energy is based upon a level of voltage across the second one of the plurality of loads during the second discharge cycle.

13. The circuit according to claim 8 wherein during a charging cycle the charging means charges the passive element with an amount of energy and wherein during a discharging cycle the controller directs a first portion of the amount of energy to a first one of the plurality of loads and a second portion of the amount of energy to a second one of the plurality of loads.

14. The circuit according to claim 13 wherein the amount of energy is based upon a level of voltage across the first one of the plurality of loads prior to the charging cycle and upon a level of voltage across the second one of plurality of loads prior to the charging cycle.

15. The circuit according to claim 13 wherein the first portion of the amount of energy is based upon a level of voltage across the first one of the plurality of loads prior to the charging cycle and wherein the second portion of the amount of energy is based upon a level of voltage across the second one of the plurality of loads prior to the charging cycle.

16. The circuit according to claim 13 wherein the first portion of the amount of energy is based upon a level of voltage across the first one of the plurality of loads during the discharging cycle and wherein the second portion of the amount of energy is based upon a level of voltage across the second one of the plurality of loads during the discharging cycle.

17. The circuit according to claim 13 wherein the controller selectively directs one of the following to occur first in response to voltage levels across the first one and the second one of the plurality of loads: the first portion of the amount of energy directed to the first one of the plurality of loads and the second portion of the amount of energy directed to the second one of the plurality of loads.

18. The circuit according to claim 13 wherein the controller selectively directs one of the following to occur first in response to voltage levels across the first one and the second one of the plurality of loads: the first portion of the amount of energy directed to the first one of the plurality of loads and the second portion of the amount of energy directed to the second one of the plurality of loads.

19. A method of charging a plurality of loads comprising the steps of:
  a. storing a charge;
  b. receiving an output voltage level from each of the plurality of loads; and
  c. sequentially distributing the charge during a discharge cycle to each of the plurality of loads via a current pulse according to the output voltage level from each of the plurality of loads.

20. The method as claimed in claim 19 wherein the current pulse is pulse width modulated.

21. The method as claimed in claim 19 wherein the current pulse is pulse frequency modulated.

22. The method as claimed in claim 19 further comprising the step of directing the charge to each of the plurality of loads on an alternating discharge cycle.

23. The method as claimed in claim 19 further comprising the step of directing the charge to each of the plurality of loads on every discharge cycle.

24. A method of charging a plurality of loads comprising the steps of:
  a. storing a first amount of energy in a passive element during a first charging cycle and subsequently storing a second amount of energy in the passive element during a second charging cycle; and
  b. sequentially distributing a first portion of the first amount of energy during a first discharging cycle to a first one of the plurality of loads and does not distribute energy to any other load, and sequentially distributing a second portion of the second amount of energy during a second discharging cycle to a second one of the plurality of loads and does not distribute energy to any other load.

25. The method as claimed in claim 24 further comprising the step of directing the first portion of energy to the first one of the plurality of loads through a first load switch and directing the second portion of energy to the second one of the plurality of loads through a second load switch.

26. The method as claimed in claim 25 further comprising the step of preventing extraneous stray energy from escaping through the first load switch and the second load switch by coupling each one of a plurality of diodes in series with the first load switch and in series with the second load switch.

27. The method as claimed in claim 24 further comprising the steps of collecting the first amount of energy based upon a level of voltage across the first one of the plurality of loads prior to the first charging cycle; and collecting the second amount of energy based upon a level of voltage across the second one of the plurality of loads prior to the second charging cycle.

28. The method as claimed in claim 24 further comprising the steps of collecting the portion of the first amount of energy is based upon a level of voltage across the first one of the plurality of loads during the first discharge cycle; and collecting the portion of the second amount of energy based upon a level of voltage across the second one of the plurality of loads during the second discharge cycle.

29. The method according to claim 24, wherein the first portion and the second portion are modulated by a pulse width modulation circuit.

30. The method according to claim 24, wherein each load receives a respective regulated DC voltage.

31. A method of charging a plurality of loads having a discharging cycle and a charging cycle comprising the steps of:
  a. storing an amount of energy in a passive element; and
  b. sequentially distributing a first portion of the amount of energy during the discharging cycle to a first one of the plurality of loads, and sequentially distributing a second portion of the amount of energy during the discharging cycle to a second one of the plurality of loads.

32. The method as claimed in claim 31 further comprising the step of directing the first portion of energy to the first one of the plurality of loads through a first load switch and directing the second portion of energy to the second one of the plurality of loads through a second load switch.

33. The method as claimed in claim 32 further comprising the step of preventing extraneous stray energy from escaping through the first load switch and the second load switch by coupling each one of a plurality of diodes in series with the first load switch and in series with the second load switch.

34. The method as claimed in claim 31 wherein the step of storing collects the amount of energy based upon a level of voltage across the first one of the plurality of loads and based upon a level of voltage across the second one of the plurality of loads prior to the charging cycle.

35. The method as claimed in claim 31 wherein the step of storing further comprising the steps of: storing the first portion of the amount of energy based upon a level of load voltage across the first one of the plurality of loads prior to the charging cycle; and storing the second portion of the amount of energy based upon a level of load voltage across the second one of the plurality of loads prior to the charging cycle.

36. The method as claimed in claim 31 wherein the step of storing further comprising the steps of: storing the first portion of the amount of energy based upon a level of load voltage across the first one of the plurality of loads during the discharging cycle; and storing the second portion of the amount of energy based upon a level of load voltage across the second one of the plurality of loads during the discharging cycle.

37. The method as claimed in claim 31 wherein the step of distributing the first portion and the second portion further comprises the step of selectively directing one of the following to occur first: the first portion of the amount of energy directed to the first one of the plurality of loads and the second portion of the amount of energy directed to the second one of the plurality of loads, and wherein the step of selectively directing is in response to voltage levels across the first one and the second one of the plurality of loads.

38. The method as claimed in claim 31 wherein the step of distributing the first portion and the second portion further comprises the step of selectively directing one of the following to occur first: the first portion of the amount of energy directed to the first one of the plurality of loads and the second portion of the amount of energy directed to the second one of the plurality of loads, and wherein the step of selectively directing is in response to voltage levels across the first one and the second one of the plurality of loads.

39. A circuit for providing multiple output boost regulation for a plurality of loads comprising:
   a. a charging means comprising a power source and a passive element to store a charge from the power source;
   b. a switching circuit comprising a plurality of switches for connection to each of the plurality of loads and the charging means; and
   c. a controller for coordinating the switching circuit to regulate and sequentially direct the charge from the passive element to each of the plurality of loads so that a regulated DC output voltage level is obtained at each of the plurality of loads wherein the controller comprises a pulse frequency modulation circuit.

40. The circuit according to claim 39 wherein the pulse frequency modulation circuit is configured to charge each of the plurality of loads within a same charge cycle of the charging means in response to the predetermined output voltage level.

41. The circuit according to claim 39, wherein each load receives a respective regulated DC voltage.

* * * * *